United States Patent
Zhang et al.

(10) Patent No.: US 10,424,805 B2
(45) Date of Patent: Sep. 24, 2019

(54) BENZOTHIOPHENE-BASED REDOX MOLECULES FOR FLOW BATTERY

(71) Applicant: UCHICAGO ARGONNE, LLC, Chicago, IL (US)

(72) Inventors: Jingjing Zhang, Willowbrook, IL (US); Lu Zhang, Lisle, IL (US); Ilya A. Shkrob, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 168 days.

(21) Appl. No.: 15/677,255

(22) Filed: Aug. 15, 2017

(65) Prior Publication Data

US 2019/0058205 A1    Feb. 21, 2019

(51) Int. Cl.
  *H01M 8/18*    (2006.01)
  *H01M 8/023*   (2016.01)

(52) U.S. Cl.
  CPC ........... *H01M 8/188* (2013.01); *H01M 8/023* (2013.01)

(58) Field of Classification Search
  CPC .................................................. H01M 8/188
  USPC .................................................. 429/101, 105
  See application file for complete search history.

(56) References Cited

U.S. PATENT DOCUMENTS

| | | | |
|---|---|---|---|
| 3,996,064 | A | 12/1976 | Thaller |
| 4,362,791 | A | 12/1982 | Kaneko et al. |
| 5,366,824 | A | 11/1994 | Nozaki |
| 5,709,968 | A | 1/1998 | Shimizu |
| 6,692,862 | B1 | 2/2004 | Zocchi |
| 6,872,376 | B2 | 3/2005 | Tanaka et al. |
| 7,258,947 | B2 | 8/2007 | Kubata et al. |
| 7,320,844 | B2 | 1/2008 | Skyllas-Kazacos |
| 8,003,260 | B2 | 8/2011 | Exnar et al. |
| 8,968,885 | B2 | 3/2015 | Brown et al. |
| 9,300,000 | B2 | 3/2016 | Jansen et al. |
| 2006/0199080 | A1 | 9/2006 | Amine et al. |
| 2006/0263695 | A1 | 11/2006 | Dahn et al. |
| 2007/0092802 | A1 | 4/2007 | Ahn et al. |

(Continued)

FOREIGN PATENT DOCUMENTS

| | | |
|---|---|---|
| EP | 1091434 A1 | 4/2001 |
| WO | 200129920 A1 | 4/2001 |
| WO | 2011131959 A1 | 10/2011 |

OTHER PUBLICATIONS

Pappenfus, et al., Synthesis and Electronic Properties of Oxidized Benzo[1,2-b:4,5-b']dithiophenes, Sep. 2014, The Journal of Organic Chemistry, 79, 9408-9412 (Year: 2014).*

(Continued)

*Primary Examiner* — Sean P Cullen
(74) *Attorney, Agent, or Firm* — Olson & Cepuritis, Ltd.

(57) ABSTRACT

The present invention provides a redox flow battery comprising a negative electrode (also referred to herein as an "anode") immersed in a first liquid electrolyte (also referred to herein as a "negative electrolyte" or "anolyte"), a positive electrode (also referred to herein as a "cathode") immersed in a second liquid electrolyte (also referred to herein as a "positive electrolyte" or "catholyte"), and a cation-permeable separator (e.g., a membrane or other cation-permeable material) partitioning the negative electrode/anolyte from the positive electrode/catholyte. The redox reactant of the catholyte comprises a compound of Formula (I) as described herein.

20 Claims, 5 Drawing Sheets

(56) References Cited

U.S. PATENT DOCUMENTS

| | | |
|---|---|---|
| 2008/0220335 A1 | 9/2008 | Casteel |
| 2008/0241643 A1 | 10/2008 | Lepp et al. |
| 2009/0017379 A1 | 1/2009 | Inatomi et al. |
| 2009/0176162 A1 | 7/2009 | Exnar et al. |
| 2010/0047671 A1 | 2/2010 | Chiang et al. |
| 2010/0237298 A1 | 9/2010 | Armand et al. |
| 2010/0297481 A1 | 11/2010 | Son et al. |
| 2010/0323264 A1 | 12/2010 | Chiang et al. |
| 2011/0052945 A1 | 3/2011 | Whitacre |
| 2011/0189549 A1 | 8/2011 | Sun et al. |
| 2011/0195283 A1 | 8/2011 | Sun et al. |
| 2011/0200848 A1 | 8/2011 | Chiang et al. |
| 2011/0294003 A1 | 12/2011 | Zhang et al. |
| 2011/0294017 A1 | 12/2011 | Weng et al. |
| 2012/0135278 A1 | 5/2012 | Yoshie et al. |
| 2013/0189571 A1 | 7/2013 | Abouimrane et al. |
| 2013/0224538 A1* | 8/2013 | Jansen .......... H01M 8/188 429/72 |
| 2015/0372333 A1 | 12/2015 | Odom et al. |
| 2015/0380760 A1 | 12/2015 | Spaziante et al. |
| 2016/0013506 A1 | 1/2016 | Dong et al. |

OTHER PUBLICATIONS

Abraham, K.M. et al., n-Butylferrocene for Overcharge Protection of Secondary Lithium Batteries, Journal of the Electrochemical Society, 137 (6), 1856-1857 (1990).

Amine, K., Develop and Evaluate Materials and Additives That Enhance Thermal and Overcharge Abuse, Department of Energy, (Argonne National Laboratory), Advanced Battery Research Review, Washington, D.C. (2010).

Armand, M. et al., Conjugated Dicarboxylate Anodes for Li-ion Batteries, Nature Materials, 8 (2), 120-125 (2009).

Behl, W. K. et al., Electrochemical Overcharge Protection of Rechargeable Lithium Batteries, I. Kinetics of Iodide/Tri-Iodide/ Iodine Redox Reactions on Platinum LiAsF6/Tetrahydrofuran Solutions, Journal of the Electrochemical Society, 135 (1), 16-21 (1988).

Behl, W. K. et al., Electrochemical Overcharge Protection of Rechargeable Lithium Batteries, II. Effect of Lithium Iodide-Iodine Additives on the Behavior of Lithium Electrode in LiAsF6- Tetrahydrofuran Solutions, Journal of the Electrochemical Society, 135 (1), 21-25 (1988).

Brushett, F.R. et al., An All-Organic Non-Aqueous Lithium-Ion Redox Flow Battery, Advanced Energy Materials, 1-7, (2012).

Buhrmester C. et al., Studies of Aromatic Redox Shuttle Additives for LiFePO4-Based Li-Ion Cells, Journal of the Electrochemical Society, 152 (12) A2390-A2399 (2005).

Chakrabarti, M.H. et al., Evaluation of Electrolytes for Redox Flow Battery Applications, Electrochimica Acta, 52 (5), 2189-2195 (2007).

Chang, D.W. et al., Novel Quinoxaline-Based Organic Sensitizers for Dye-Sensitized Solar Cells, Organic Letters 13 (15), 3880-3883 (2011).

Chen, Z. et al., Redox Shuttles for Safer Lithium-Ion Batteries, Electrochimica Acta, 54 (24), 5605-5613 (2009).

Chen, Z. et al., Lithium Borate Cluster Salts as Redox Shuttles for Overcharge Protection of Lithium-Ion Cells, Electrochemical and Solid State Letters, 13 (4), A39-A42 (2010).

Crabtree, G. et al., Integrating Renewable Electricity on the Grid—A Report by the APS Panel on Public Affairs, American Physical Society, Washington, D.C. (2010).

Duduta, M. et al., Semi-Solid Lithium Rechargeable Flow Battery, Advanced Energy Materials, 1 (4) 511-516 (2011).

Eyer, J. et al., Energy Storage for the Electricity Grid: Benefits and Market Potential Assessment Guide, A Study for the DOE Energy Storage Systems Program, Sandia National Laboratories (2010).

Hu, Bo et al., A Long Cycling Aqueous Organic Redox Flow Battery (AORFB) Towards Sustainable and Safe Energy Storage, Journal of the American Chemical Society, http://pubs.acs.org. Dec. 15, 2016 (pp. 1-10).

Huskinson, Brian et al., A Metal-Free Organic-Inorganic Aqueous Flow Battery, Nature 12909, vol. 505, 195-210, (2014).

Janoschka, Tobias et al., Aqueous Redox-Flow Battery With High Capacity and Power: the TEMPTMA/MV System, Angew. Communications Int. Ed 55, 1-5 (2016).

Kim J.H. et al., Development of Metal-Based Electrodes for Non-aqueous Redox Flow Batteries, Electrochemistry Communication, 13 (9) 997-1000 (2011).

Lee, J.-Y et al., Low Band-Gap Polymers Based on Quinoxaline Derivatives and Fused Thiophene as Donor Materials for High Efficiency Bulk-Heterojunction Photovoltaic Cells, Journal of Materials Chemistry 19 (28), 4938-4945 (2009).

Li, Zhen et al., Electrochemical Properties of an All-Organic Redox Flow Battery Using 2,2,6,6-Tetramethyl-1-Piperidinyloxy and N-Methylphthalimide, Electrochemical and Solid State Letters 14 (12), A171-A173 (2011).

Lin, Kaixiang et al., A Redox-Flow Battery With An Alloxazine-Based Organic Electrolyte, Nature Energy 10.1038, vol. 1, 1-8 (2016).

Lin, Kaixiang et al., Alkaline Quinone Flow Battery, Science, vol. 349 (6255), 1529-1532 (2015).

Liu, Q. et al., Non-aqueous Chromium Acetylacetonate Electrolyte for Redox Flow Batteries, Electrochemistry Communications, 12 (11), 1634-1637 (2010).

Liu, Q. et al., Non-aqueous Vanadium Acetylacetonate Electrolyte for Redox Flow Batteries, Electrochemistry Communications, 11, 2312-2315 (2009).

Matsuda, Y. et al., A Rechargeable Redox Battery Utilizing Ruthenium Complexes with Non-Aqueous Organic Electrolyte, Journal of Applied Electrochemistry, 18 (6), 909-914 (1988).

Matsunaga T. et al., High-Performance Lithium Secondary Batteries Using Cathode Active Materials of Triquinoxalinylenes Exhibiting Six Electron Migration; Chemistry Letters 40 (7), 750-752 (2011).

Moshurchak, L.M. et al., High-Potential Redox Shuttle for Use in Lithium-Ion Batteries, Journal of the Electrochemical Society, 156 (4) A309-A312 (2009).

Pan, Feng et al., Redox Species of Redox Flow Batteries: A Review, Molecules 20, 20499-20517 (2015).

Ponce De Leon, C. et al., Redox Flow Cells for Energy Conversion, Journal of Power Sources, 160 (1), 716-732 (2006).

Sevov, Christo S. et al., Cyclopropenium Salts as Cyclable, High-Potential Catholytes in Nonaqueous Media, Advanced Energy Materials 1602027, 1-5 (2016).

Skyllas-Kazacos M. et al., Progress in Flow Battery Research and Development, Journal of the Electrochemical Society, 158 (8), R55-R79 (2011).

Sleightholme, A. E.S. et al., Non-aqueous Manganese Acetylacetonate Electrolyte for Redox Flow Batteries, Journal of Power Sources, 196 (13), 5742-5745 (2011).

Tormena, C.F. et al., Revisiting The Stability of Endolexo Diels-Alder Adducts Between Cyclopentadiene and 1,4- Benzoquinone, Journal Brazil Chemical Society 21 (1), pp. 112-118 (2010).

Walker, W. et al., Ethoxycarbonyl-Based Organic Electrode for Li-Batteries, Journal of the American Chemical Society, 132 (18), 6517-6523 (2010).

Walker, W. et al., Electrochemical Characterization of Lithium 4,4'-tolane-dicarboxylate for Use As a Negative Electrode in Li-Ion Batteries, Journal of Materials Chemistry, 21 (5), 1615-1620 (2011).

Wang, W. et al., A New Redox Flow Battery Using Fe/V Redox Couples in Chloride Supporting Electrolyte, Energy & Environmental Science, 4 (10), 4068-4073 (2011).

Weber, A.Z. et al., Redox Flow Batteries: A Review, Journal of Applied Electrochemistry, 41 (10) 1137-1164 (2011).

Wen, J. et al., A Review on Lithium-Ion Batteries Safety Issues: Existing Problems and Possible Solutions, Materials Express 2, (3), pp. 197-212 (2012).

Winsberg, J. et al., Redox-Flow Batteries: From Metals to Organic Redox-Active Materials, Angew. Chem. Int. Ed. 56, 686-711 (2017).

Yang, Z. et al., Electrochemical Energy Storage for Greed Grid. Chemical Reviews, 111 (5), 3577-3613 (2011).

Yamamura, T. et al., Electrochemical Investigation of Uranium β-diketonates for All-Uranium Redox Flow Battery, Electrochimica Acta 48, 43-50 (2002).

(56) References Cited

OTHER PUBLICATIONS

Yates, P. et al., The 1:1 and 2:1 Adducts of Cyclopentadiene with p-Benzoquinone, Can. J. Chemical 68, pp. 1984-1900 (1990).
Zhang, L. et al., Redox Shuttle Additives for Lithium-Ion Battery, Lithium Ion Batteries—New Developments 7, 173-189 (2012).
Zhang, L. et al., Molecular Engineering Towards Safer Lithium-Ion Batteries: A Highly Stable and Compatible Redox Shuttle for Overcharge Protection, Energy & Environmental Science 5, 8204-8207 (2012).
Zhang, L. et al., Redox Shuttles for Overcharge Protection of Lithium-Ion Batteries, ECS Transactions 45 (29), 57-66 (2013).

\* cited by examiner

BENZOTHIOPHENE-BASED REDOX MOLECULES FOR FLOW BATTERY

CONTRACTUAL ORIGIN OF THE INVENTION

The United States Government has rights in this invention pursuant to Contract No. DE-ACO2-06CH11357 between the United States Government and UChicago Argonne, LLC representing Argonne National Laboratory.

FIELD OF THE INVENTION

This invention relates to redox flow batteries. More particularly, this invention relates to two-electron redox materials for use in redox flow batteries.

BACKGROUND OF THE INVENTION

Low-cost, scalable energy storage systems are needed to improve the energy efficiency of the electrical grid (e.g., load-leveling, frequency regulation) and to facilitate the large-scale penetration of renewable energy resources (e.g., wind, solar). While alternative energy technologies exist, they cannot be directly connected to the grid because of their variable output. Electrochemical energy storage may provide the best combination of efficiency, cost, and flexibility to enable these applications. Of particular interest are redox flow batteries, which are rechargeable electrochemical energy storage devices that utilize the oxidation and reduction of two soluble electroactive species for charging (absorbing energy) and discharging (delivering energy). Unlike conventional secondary batteries, the energy-bearing species are not stored within an electrode structure but in separate liquid reservoirs and pumped to and from the power converting device when energy is being transferred. Because of this key difference, flow battery systems can be more durable than conventional battery systems as electrode reactions are not accompanied by morphological changes due to the insertion or removal of the active species and can be more scalable than conventional battery systems as the energy capacity may be easily and inexpensively modulated by varying the reservoir volume or the species concentration, without sacrificing power density. Thus, while flow batteries may not compete with compact lithium (Li)-ion batteries for portable applications (e.g., cell phones, laptops) due to lower overall energy densities, they are well-suited for large-scale stationary applications.

Since their inception in the 1960s, a large number of aqueous redox flow batteries have been developed including iron-chromium, bromine-polysulfide, vanadium-bromine, and all-vanadium systems. Several aqueous hybrid systems also have been developed, where one or both electrode reactions are a deposition/dissolution process, such as zinc-bromine and soluble lead-acid systems.

Though several of these aqueous technologies have been successfully demonstrated at the megawatt-scale, none have experienced widespread commercialization due to low energy densities, low round-trip energy efficiencies, and high costs. Indeed, all flow batteries based on aqueous electrochemical couples are limited by the electrochemical properties of water, which is only stable within a small potential window (typically 1.2-1.6 V) outside of which water electrolysis occurs. Employing non-aqueous electrolytes offers a wider window of electrochemical stability, which, in turn, enables flow batteries to operate at higher cell potentials (e.g., >2 V). If appropriate redox couples can be identified, operating at higher cell voltages leads to greater system energy (and power) densities and higher energy efficiencies. Moreover, as fewer cell units and ancillary parts would be required to achieve the same power output as an aqueous system, hardware costs would be significantly reduced and system reliability increased. In contrast to their aqueous counterparts, only a few non-aqueous flow batteries have been reported. The majority of the reported non-aqueous flow batteries are anion-exchange systems which employ single electrolytes composed of metal-centered coordination complexes. Despite their promising cell potentials, these systems have been hampered by low efficiencies and the limited solubility of coordination complexes.

All current flow battery designs have functional or cost-performance limitations that hamper large scale adoption of this technology. Thus, there is an ongoing need for new redox flow batteries. The present invention addresses this need by providing a redox flow battery that utilizes a two-electron benzodithiophene-based redox material.

SUMMARY OF THE INVENTION

The present invention provides a redox flow battery comprising a negative electrode (also referred to herein as an "anode") immersed in a first liquid electrolyte (also referred to herein as a "negative electrolyte" or "anolyte"), a positive electrode (also referred to herein as a "cathode") immersed in a second liquid electrolyte (also referred to herein as a "positive electrolyte" or "catholyte"), and a cation-permeable separator (e.g., a membrane or other cation-permeable material) partitioning the negative electrode/anolyte from the positive electrode/catholyte. During charging and discharging, the electrolytes are circulated over their respective electrodes, while cations shuttle across the membrane between the two electrolytes to balance the charges that develop due to oxidation and reduction of components in the electrolytes. The anode and cathode act as current collectors for the electrons involved in the redox reactions. The cation-permeable separator membrane is adapted to allow cations to cross the membrane and balance out charges in the anolyte and catholyte that develop during the charging and discharging of the battery.

The catholyte of the redox flow battery comprises a redox reactant of Formula (I):

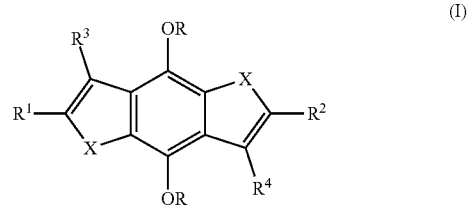

(I)

wherein each X is S or $SO_2$; each R independently is selected from H, alkyl (e.g., $C_1$ to $C_4$ alkyl), substituted-alkyl, and a poly(alkylene glycol) group (e.g., a group of formula: $-(CR''_2-CR''_2O)_x-R'$, where x is 1 to 5; and each R'' independently is H or alkyl (e.g., $C_1$ to $C_4$ alkyl)); $R^1$, $R^2$, $R^3$, and $R^4$ are independently selected from H, alkyl (e.g., $C_1$ to $C_4$ alkyl), substituted alkyl, halogen (e.g., F, Cl, Br), —OR', —SR', —$SO_2$R'; —(C=O)OR', —(C=O)$NR'_2$, cyano (—CN), —(C=O)R', —$NR'_2$, a sulfonic acid group (—$SO_3$H and salts thereof), and a phosphonic acid group (—$PO_3H_2$ and salts thereof); each R' independently is selected from H, alkyl (e.g., $C_1$ to $C_4$ alkyl), and substituted-alkyl; and each substituted-alkyl independently is an alkyl group (e.g., $C_1$ to $C_4$ alkyl) substituted by one or more of F, Cl, Br, CN, $CF_3$, an alkenyl group, an alkynyl group, an aryl group (e.g., phenyl), a carboxylic acid group, an aldehyde group, ketone group, an alkoxy group, a thiol group, an alkylthio group, a primary amino group, a secondary amino group (e.g., —NHR' where R' is alkyl or substituted-alkyl), a tertiary amino group (e.g., —NR'$_2$ where each R' is alkyl or substituted-alkyl), a trialkylsilyl group, a trialkylsilyloxy group, a sulfonic acid group, and a phosphonic acid group.

In some preferred embodiments, each X is S. In some other preferred embodiments, each X is $SO_2$. In some preferred embodiments, the compound of Formula (I) is dissolved in a non-aqueous solvent. In other embodiments, in which one or more of R, R', $R^1$, $R^2$, $R^3$, and $R^4$ comprises a water-solubilizing acidic group (e.g., carboxylic acid, sulfonic acid, or phosphonic acid) or a water-solubilizing amino group (e.g., primary, secondary or tertiary amino), the compound of Formula (I) can be dissolved in an aqueous solvent, e.g., an acidic aqueous solvent.

In some embodiments, the catholyte comprises a two-electron redox material of Formula (II), which is equivalent to Formula (I) in which $R^3$ and $R^4$ is H and each X is S:

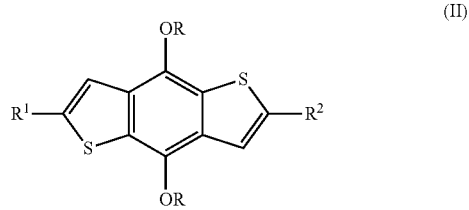

(II)

wherein each R independently is selected from H, alkyl (e.g., $C_1$ to $C_4$ alkyl), substituted-alkyl, and a poly(alkylene glycol) group (e.g., a group of formula: —(CR"$_2$—CR"$_2$O)$_x$—R', where x is 1 to 100 (e.g., 1 to 5, 1 to 10, 1 to 20, or 1 to 50); and each R" independently is H or alkyl (e.g., $C_1$ to $C_4$ alkyl)); each $R^1$ and $R^2$ independently is H, alkyl (e.g., $C_1$ to $C_4$ alkyl), substituted-alkyl, halogen (e.g., F, Cl, Br), —OR', —SR', —$SO_2$R', —(C=O)OR', —(C=O)NR'$_2$, cyano (—CN), —(C=O)R', —NR'$_2$, a sulfonic acid group, and a phosphonic acid group; each R' independently is selected from H, alkyl (e.g., $C_1$ to $C_4$ alkyl), and substituted-alkyl; and each substituted-alkyl independently is an alkyl group (e.g., $C_1$ to $C_4$ alkyl) substituted by one or more of F, Cl, Br, CN, $CF_3$, an alkenyl group, an alkynyl group, an aryl group (e.g., phenyl), a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, a sulfonic acid group, and a phosphonic acid group.

The following non-limiting embodiments are provided to illustrate various aspects and features of the redox flow batteries described herein.

Embodiment 1 is a redox flow battery comprising:
(a) an anode within an anolyte chamber;
(b) a cathode within a catholyte chamber;
(c) an anolyte comprising a solution of a first redox reactant and a first electrolyte salt;
(b) a catholyte comprising solution of a second redox reactant and a second electrolyte salt; and
(e) an ion-permeable separator membrane forming at least a portion of a common wall between the anolyte chamber and the catholyte chamber;
wherein:
the anolyte contacts the anode and the separator membrane when circulated through the anolyte chamber;
the catholyte contacts the cathode and the separator membrane when circulated through the catholyte chamber;
during charging and discharging the anolyte and catholyte are circulated over the anode and cathode, respectively, while cations from the anolyte and catholyte shuttle through the separator membrane to balance the charges that develop due to oxidation and reduction of the first and second redox reactants;
the first redox reactant has a lower redox potential than the second redox reactant;
and wherein the second redox reactant comprises a compound of Formula (I):

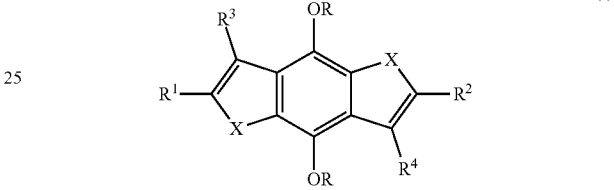

(I)

wherein:
each X is S or $SO_2$;
each R independently is selected from H, alkyl, substituted-alkyl, and a poly(alkylene glycol);
$R^1$, $R^2$, $R^3$, and $R^4$ are independently selected from H, alkyl, substituted-alkyl, halogen, —OR', —SR', —$SO_2$R', —(C=O)OR', —(C=O)NR'$_2$, cyano (—CN), —(C=O)R', —NR'$_2$, a sulfonic acid group, and a phosphonic acid group;
each R' independently is selected from H, alkyl, and substituted-alkyl; and
each substituted-alkyl independently is an alkyl group substituted by one or more of F, Cl, Br, CN, $CF_3$, an alkenyl group, an alkynyl group, an aryl group, a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, a sulfonic acid group, and a phosphonic acid group.

Embodiment 2 is the redox flow battery of Embodiment 1, wherein each X is S.

Embodiment 3 is the redox flow battery of Embodiment 1 or 2, wherein each R is a group of formula: —(CR"$_2$—CR"$_2$O)$_x$—R', wherein x is 1 to 100, and R" is H or alkyl.

Embodiment 4 is the redox flow battery of any one of Embodiments 1 to 3, wherein each R is $C_1$ to $C_4$ alkyl.

Embodiment 5 is the redox flow battery of any one of Embodiments 1 to 4, wherein each R is —$CH_2$—$CH_2$—OR'; and R' is methyl or ethyl.

Embodiment 6 is the redox flow battery of any one of Embodiments 1 to 5, wherein at least one of $R^1$, $R^2$, $R^3$, and $R^4$ is a halogen.

Embodiment 7 is the redox flow battery of any one of Embodiments 1 to 6, wherein at least one of $R^1$, $R^2$, $R^3$, and $R^4$ is F.

Embodiment 8 is the redox flow battery of any one of Embodiments 1 and 3 to 7, wherein each X is $SO_2$.

Embodiment 9 is the redox flow battery of any one of Embodiments 1 to 8, wherein the second redox reactant is dissolved in an organic solvent.

Embodiment 10 is the redox flow battery of any one of Embodiments 1 to 9, wherein the second redox reactant is dissolved in an organic solvent selected from one or more of an organic carbonate, an ether, an ester, a sulfone, a sulfoxide, and a nitrile.

Embodiment 11 is the redox flow battery of any one of Embodiments 1 to 8, wherein the catholyte comprises an aqueous solution of the second redox reactant, and the compound of Formula (I) comprises at least one acidic or basic substituent and is soluble in water and/or an aqueous acid.

Embodiment 12 is the redox flow battery of any one of Embodiments 1 to 11, wherein the compound of Formula (I) is a compound of Formula (II):

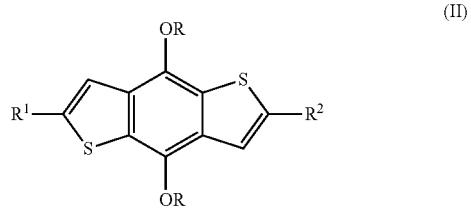

(II)

wherein:
each R independently is selected from alkyl, substituted-alkyl, and a poly(alkylene glycol) group;
each $R^1$ and $R^2$ independently is selected from H, alkyl, substituted-alkyl, halogen, —OR', —SR', —$SO_2$R', —(C=O)OR', —(C=O)NR'$_2$, —CN, —(C=O)R', —NR'$_2$, a sulfonic acid group, and a phosphonic acid group;
each R' is selected from H, alkyl, and substituted-alkyl;
each substituted-alkyl independently is an alkyl group substituted by one or more of F, Cl, Br, CN, $CF_3$, an alkenyl group, an alkynyl group, an aryl group, a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, a sulfonic acid group, and a phosphonic acid group.

Embodiment 13 is the redox flow battery of Embodiment 1, wherein the compound of Formula (I) comprises one or more of:
4,8-bis(2-methoxyethoxy)benzo[1,2-b:4,5-b']dithiophene,
4,8-bis(2-methoxyethoxy)-2,6-dibromobenzo[1,2-b:4,5-b']dithiophene,
4,8-bis(2-methoxyethoxy)-2,3,6-tribromobenzo[1,2-b:4,5-b']dithiophene,
4,8-bis(2-methoxyethoxy)-2,6-difluorobenzo[1,2-b:4,5-b']dithiophene,
4,8-bis(2-methoxyethoxy)-2,3,6-trifluorbenzo[1,2-b:4,5-b']dithiophene, and
4,8-bis(2-methoxyethoxy)-1 S-dioxo-5S-dioxbenzo[1,2-b']dithiophene.

The redox flow batteries described herein, comprising compounds of Formula (I), provide significantly higher energy storage densities per mole of redox reactant compared to conventional redox flow batteries comprising single-electron redox reactants. In particular, the compounds of Formula (I) undergo exceptional two-electron redox reactions in various electrolytes, with redox potentials comparable to 2,5-di-t-butyl-1,4-(2-methoxyethoxy)benzene (DBBB) and excellent cyclic stability.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

The present invention provides non-aqueous redox flow batteries. In some preferred embodiments, the flow battery comprises, consists essentially of, or consists of a negative electrode immersed in an anolyte, a positive electrode immersed in a catholyte, and a cation-permeable separator to allow cations to shuttle between the anolyte and the catholyte during charging and discharging. The negative electrode and positive electrode each act as current collectors.

The anolyte and catholyte each comprises, consists essentially of, or consists of an electrolyte salt and a redox reactant in a solvent. In some preferred embodiments, the solvent is a non-aqueous solvent. In some other embodiments the solvent is an aqueous solvent, e.g., an aqueous acid. The redox reactant of the catholyte is selected to have a higher redox potential than the redox reactant of the anolyte. The cation components of the electrolyte salts shuttle between the anolyte and the catholyte through the cation-permeable separator to balance charges that develop during the oxidation and reduction of the redox reactants. In the case of acidic aqueous solution, the acid component can constitute or take the place of the electrolyte salt and protons can shuttle across the cation-permeable membrane.

The redox material of the anolyte can be any redox material with a lower redox potential than the catholyte redox material. Anolyte redox reactants suitable for use in redox flow batteries as described herein are well known in the art. Non-limiting examples of such anolyte materials include anthraquinones, N-methylphthalimide, quinoxaline compounds, fluorenones, and other such materials, e.g., including materials disclosed by Winsberg et al., *Angewandte Chemie Int. Ed.;* 2017, 56:686-711, which is incorporated herein by reference in its entirety.

Figure 1:
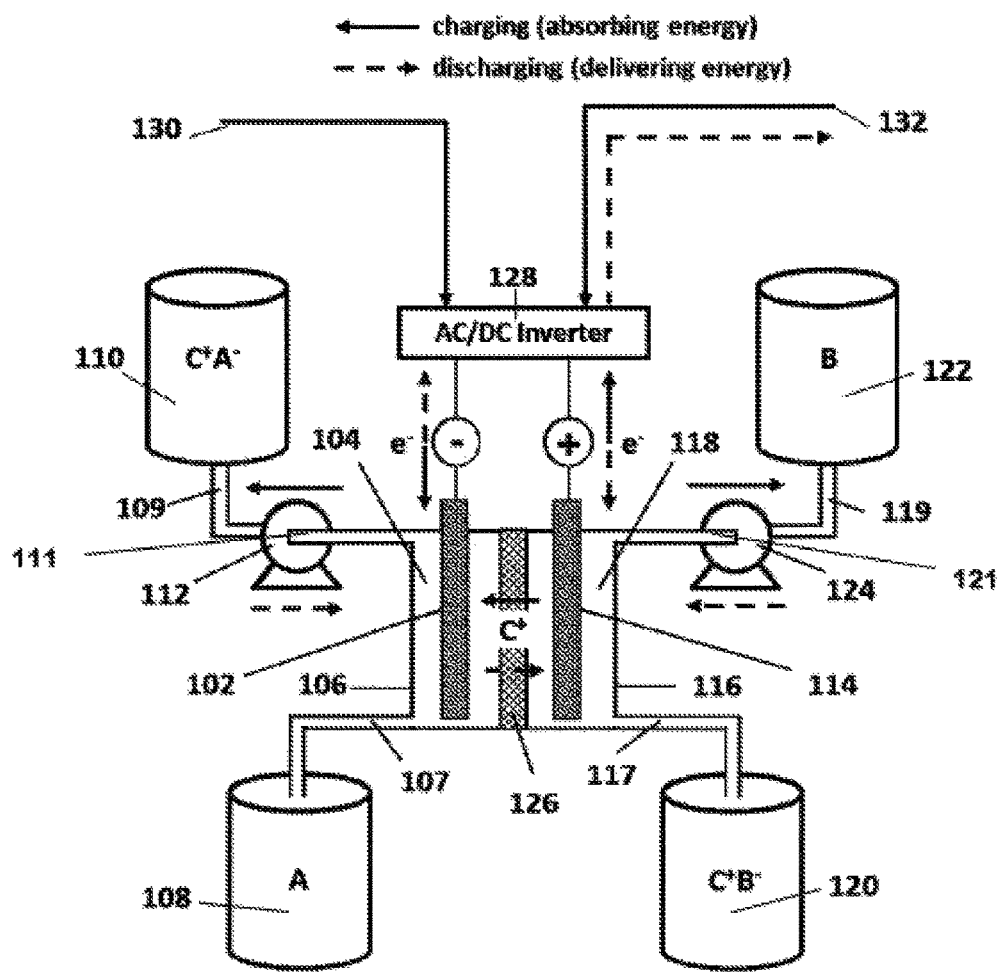
FIG. 1 provides a schematic illustration of an exemplary redox flow battery suitable for large-scale electrochemical energy storage. Species A and B represent generic negative and positive redox reactant electrode materials, respectively. Species $C^+$ represents a cation, which shuttles across a separator to maintain electroneutrality.

FIG. 1 schematically illustrates an aqueous redox flow battery design. The redox flow battery comprises negative electrode 102 within negative electrolyte chamber (anolyte chamber) 104, defined by housing 106. First negative electrolyte reservoir (anolyte reservoir) 108 is in fluid-flow communication with anolyte chamber 104 via pipe 107. Second anolyte reservoir 110 is operably connected to pump 112 via pipe 109, while pump 112 also is operably connected to anolyte chamber 104 via pipe 111. Pump 112 is adapted to facilitate transfer of negative electrolyte (anolyte) back and forth between first anolyte reservoir 108 to second anolyte reservoir 110 through anolyte chamber 104, such that the flowing electrolyte contacts negative electrode 102. The battery also includes a positive electrode 114 within positive electrolyte chamber (catholyte chamber) 118, defined by housing 116. First positive electrolyte reservoir (catholyte reservoir) 120 is in fluid-flow communication with catholyte chamber 118 via pipe 117. Second catholyte reservoir 122 is operably connected to pump 124 via pipe 119, while pump 124 also is operably connected to catholyte chamber 118 via pipe 121. Pump 124 is adapted to facilitate transfer of positive electrolyte (catholyte) back and forth between first catholyte reservoir 120 to second catholyte reservoir 122 through catholyte chamber 118, such that the flowing electrolyte contacts positive electrode 114. Cation-permeable separator 126 separates anolyte chamber 104 from catholyte chamber 118, and allows passage of cations ($C^+$) back and forth between the positive and negative electrolytes to balance out charges that form during oxidation and reduction of materials within the electrolytes.

During charging of the redox flow battery, an electric potential is applied to the negative electrode 102 and positive electrode 114, e.g., from an energy source 130 via AC/DC inverter 128, while simultaneously pumping the negative electrolyte over negative electrode 102 from first NE reservoir 108 to second NE reservoir 110, and simultaneously pumping the positive electrolyte over the positive electrode 114 from the first PE reservoir 120 to the second PE reservoir 122. Cations ($C^+$) pass through cation-permeable separator 126 to balance the charges. A negative redox reactant material (represented by $A/A^-C^+$) and a positive redox reactant material (represented by $B/B^-C^+$) in the electrolytes undergo redox reactions upon contact with the electrodes such that the reduced from of A is stored in second NE reservoir 110, while the oxidized form of B is stored in the second PE reservoir 122. In this way, energy can be stored by charging the battery from energy source 130 during off-peak usage periods.

During discharge, the electrodes are placed in a circuit (e.g., a power grid 132) and the direction of electrolyte flow is reversed, with the stored reduced negative electrolyte being pumped over negative electrode 102 back into first anolyte reservoir 108, and the stored oxidized positive electrolyte being pumped over positive electrode 114 back into first catholyte reservoir 120. Cations again transfer through cation-permeable separator 126 (in the opposite direction) to balance the charges resulting from redox reactions at the electrodes. The energy stored in the system during charging can thus be directly used to perform work or can be transferred into power grid 132 during peak usage periods to supplement the power supply. AC/DC inverter 128 again can be used to facilitate transfer of energy to an AC power grid.

Figure 2:
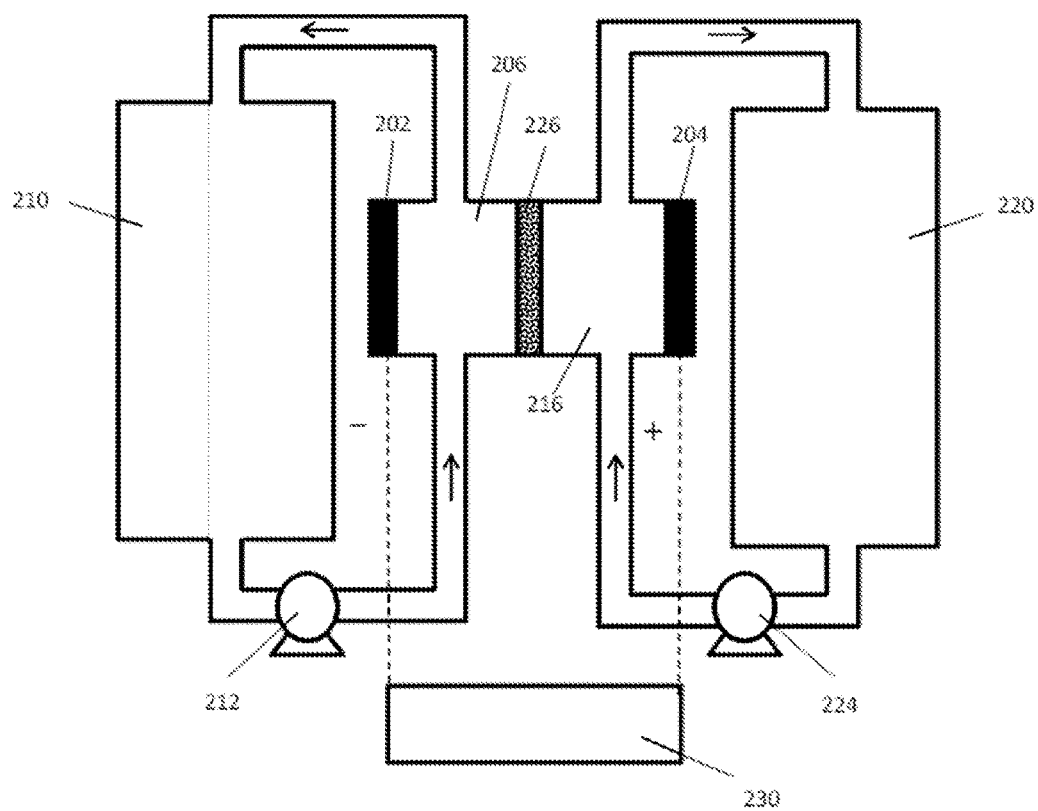
FIG. 2 provides an alternative schematic illustration of an exemplary redox flow battery suitable for large-scale electrochemical energy storage.

FIG. 2 schematically illustrates another aqueous redox flow battery design. The redox flow battery comprises anode 202 within anolyte chamber 206. Anolyte storage tank 210 is in fluid-flow communication with anolyte chamber 206, and pump 212 is adapted to circulate anolyte through anolyte chamber 206, such that the flowing anolyte contacts anode 202. The battery also includes a cathode 204 within catholyte chamber 216. Catholyte storage tank 220 is in fluid-flow communication with catholyte chamber 216, and pump 224 is adapted to circulate catholyte through catholyte chamber 216, such that the flowing catholyte contacts cathode 204. Cation-permeable separator membrane 226 separates anolyte chamber 206 from catholyte chamber 216, and allows passage of cations (e.g., $H^+$, $Li^+$, $Na^+$, and the like) back and forth between the anolyte and catholyte to balance out charges that form during oxidation and reduction of the redox materials within the anolyte and catholyte.

During charging of this redox flow battery design, an electric potential is applied to the anode 202 and cathode 204, e.g., from an energy source 230, e.g., via an AC/DC converter, while simultaneously pumping the anolyte through anolyte chamber 206 from anolyte storage tank 210, and simultaneously pumping the catholyte through catholyte chamber 216 from catholyte storage tank 220. The electrical potential across the anode and cathode causes redox reactions of the redox reactants in the anolyte (reduction) and catholyte (oxidation), while cations pass through cation-permeable separator 226 to balance the charges that develop due to the redox reactions. The anolytes and catholytes are circulated back into their respected storage tanks (210 and 220) so that the concentration of the reduced anolyte builds up in the circulating anolyte solution and the concentration of oxidized catholyte builds up in the circulating catholyte solution. In this way, energy can be stored by charging the battery from energy source 230 during off-peak usage periods.

During discharge, the electrodes 202 and 204 are placed in a circuit (e.g., with a power grid) and the reduced anolyte is pumped through the anolyte chamber 206, while the oxidized catholyte is pumped through the catholyte chamber 216. Cations again transfer through cation-permeable separator 226 (in the opposite direction) to balance the charges resulting from redox reactions at the electrodes induced by the load from the circuit. As the battery discharges, the reduced anolyte is oxidized back to its original form and the oxidized catholyte is reduced back to its original form. The energy stored in the system during charging can thus be directly used to perform work or can be transferred into the circuit (e.g., the power grid). An AC/DC converter again can be used to facilitate transfer of energy to an AC power grid. Once fully or partially discharged, the charging and discharging cycles can be repeated.

The negative and positive electrodes (anode and cathode, respectively) each can comprise, consist essentially of, or consist of a metal (e.g., platinum, copper, aluminum, nickel or stainless steel), a carbon material (e.g., carbon black, activated carbon, amorphous carbon, graphite, graphene, or a nanostructured carbon material), or a combination thereof. The electrodes can be porous, fluted, or smooth.

Pumps suitable for use in the flow batteries described herein include internal gear pumps, screw pumps, shuttle block pumps, flexible vane pumps, sliding vane pumps, circumferential piston pumps, helical twisted root pumps, piston pumps, diaphragm pumps, peristaltic pumps, centrifugal pumps, and the like, which are well known in the liquid pumping art. The utility of a given pump will be dependent on the chemical resistance of the pump to the electrolyte components in contact therewith (i.e., materials compatibility).

A cation-permeable separator membrane is situated between the anolyte chamber and the catholyte chamber and forms a common wall (or at least part of a common wall) between the two chambers. The separator is adapted to allow cations to flow back and forth between the negative and positive electrolytes upon charging and discharging of the battery. The separator can be, for example, a cation-permeable membrane, sheet, panel, or film that is permeable to the cations of the electrolytes. In some embodiments, the separator is at least partially impermeable to the redox components of the electrolytes, although this is not an absolute requirement for the batteries of the present invention.

Non-limiting examples of suitable separator materials include, NAFION® type ion exchange membranes (sulfonated tetrafluoroethylene-based tluoropolymer-eopolymers), other porous polymeric materials such as, for example, sulfonated poly(ether ketones), polysulfones, polyethylene, polypropylene, ethylene-propylene copolymers, polyimides, polyvinyldifluorides, and the like, which can be in the form of membranes, matrix-supported gels, sheets, films, or panels. Other suitable materials include porous ceramics, porous insulated metals, cation-conducting glasses, and zeolites. Alternatively, the separator can be an interface between immiscible liquids. In such case, a porous film, panel, or mesh might be included to aid in maintaining separation between the liquids (e.g., as a physical support or guide to aid in maintaining laminar flow at the interface).

The redox reactants can be present in the catholyte and anolyte at concentrations in the range of about 0.001 M to about 5 M. In some embodiments, the redox reactants are present in the catholyte and anolyte at concentrations in the range of about 0.1 M to 3 M, or 0.25 M to 2 M.

The anolyte and catholyte also preferably comprise one or more electrolyte salts, for example, alkali metal salts, alkaline earth salts, organic salts, and the like. In some preferred embodiments, the electrolyte salts utilized in anolyte and catholyte typically are alkali metal salts (e.g., lithium salts such as lithium tetrafluoroborate or lithium hexafluorophosphate, or sodium salts). The electrolyte can include any salt that is suitable for use as cation source in electrolytes for flow batteries, which salts are well known in the secondary battery art. Non-limiting examples of lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiTDT), lithium trifluoromethanesulfonate (LiTf), lithium perchlorate (LiClO$_4$), lithium bis(oxalato)borate (LiBOB), lithium difluoro(oxalato)borate (LiDFOB), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LBETI), lithium tetracyanoborate (LiB(CN)$_4$), lithium nitrate, combinations of two or more thereof, and the like. Corresponding sodium and ammonium salts also can be used. Preferably, the lithium salt is selected from one or more of LiDFOB, LiPF$_6$, LiBF$_4$, LiBOB, LiClO$_4$, LiFSI, LiTFSI, and LiAsF$_6$.

The electrochemically stable organic solvent components of the negative and positive electrolytes can be composed of a single solvent or a combination of two or more solvents. The solvent or solvents of the anolyte can be the same as the solvent or solvents of the catholyte, or the anolyte and catholyte can comprise different solvents. Any organic solvents that are suitable for use in non-aqueous alkali metal ion (e.g., lithium ion) batteries, for example, can be utilized. Such solvents are well known in the battery art, and include, for example, organic carbonates (e.g., ethylene carbonate, propylene carbonate, ethyl methyl carbonate, and the like), ethers (e.g., diethyl ether, tetrahydrofuran, 2-methyl tetrahydrofuran, dimethoxyethane, and 1,3 dioxolane), esters (e.g., methyl formate, gamma-butyrolactone, and methyl acetate), sulfones (e.g., ethyl methyl sulfone or sulfolane), sulfoxides (e.g., dimethyl sulfoxide or diethyl sulfoxide), and nitriles (e.g., acetonitrile). Preferably, the solvents comprise, consist essentially of, or consist of one or more organic carbonates such as ethylene carbonate (EC), propylene carbonate (PC), dimethyl carbonate (DMC), diethyl carbonate (DEC), ethyl methyl carbonate (EMC), or a combination of two or more of the foregoing carbonates. Examples of some preferred solvents include propylene carbonate, and mixtures of ethylene carbonate and ethyl methyl carbonate in an EC/EMC volume or weight ratio of about 3/7.

The acid components of aqueous catholytes and anolytes can be any acid with an oxidation potential greater than that of water, e.g., sulfuric acid, phosphoric acid, hydrochloric acid, citric acid, acetic acid, and the like.

Benzothiophene and benzodithiophene compounds are well known in the chemical arts. The benzothiophene ring system, including thiophene rings with substituents alpha and/or beta to the sulfur, can be prepared by a variety of methods, including, e.g., thio-annulation of 2-bromo alkynylbenzenes with sodium sulfide in the presence of CuI and tetramethylethylendiamine (TMEDA) (Sun et al., *J. Org. Chem.*, 2011, 76, 7546-7550); photocatalytic radical annulation of o-methylthio-arenediazonium salts with alkynes (Hari et al., *Org. Lett.*, 2012, 14: 5334-5337); sequential Ullmann-type C—S bond coupling and subsequent Wittig reaction (Yu et al., *J. Org. Chem.*, 2013, 78, 8898-8899); and intramolecular Wittig reactions (Syu et al., *Org. Lett.*, 2011, 13 (11): 2970-2973; Buchwald et al., *J. Org. Chem.*, 1989, 54 (12): 2793-2797).

Additionally, benzodithiophenes can be functionalized by a variety of methods also used for functionalizing olefins. For example, the thiophene rings can be functionalized by electrophilic aromatic substitution (e.g., by sulfonylation in sulfuric acid, by Lewis acid catalyzed halogenation, by chloromethylation with formaldehyde in hydrochloric acid, and the like), by nucleophilic aromatic substitution (e.g., displacement of a halogen by a nucleophile such as cyano, alkoxy, alkylthio anions, and the like) and by deprotonation of the alpha hydrogen with strong based followed by, e.g., alkylation, carboxylation, and the like. Many benzodithiophene compounds are also commercially available.

The following non-limiting examples are provided to illustrate certain features and aspects of the redox flow batteries described herein.

Example 1. Preparation of Thiophene Redox Molecule

A. Synthesis of 4,8-bis(2-methoxyethoxy)benzo[1,2-b:4,5-b']dithiophene (BDT-1)

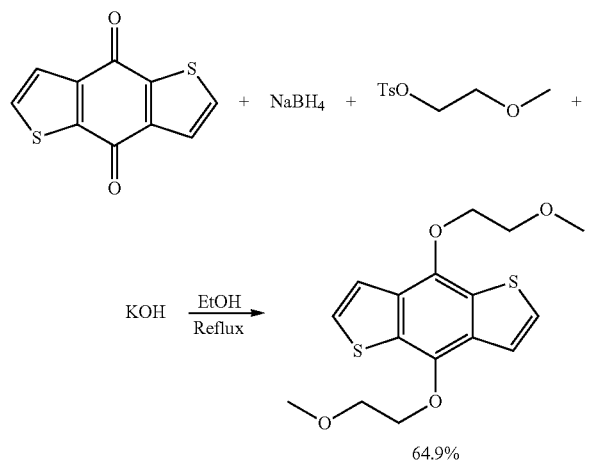

64.9%

NaBH$_4$ (0.99 g, 26.2 mmol) was added in portions over half an hour to a suspension of benzo[1,2-b:4,5-b']dithiophene-4,8-dione (1.0 g, 4.54 mmol) in ethanol (10 mL) and water (10 mL). The reaction mixture was vigorously stirred at room temperature for about 30 minutes before about 2 mL of 10 M aqueous KOH solution was added. Then the reaction mixture was heated to 85° C. followed by addition of 2-methoxyethyl-4-methylbenzenesulfonate (2.1 g, 9.12 mmol) over about 1 hour. The reaction was monitored by GC-MS. Upon the completion of the reaction, the reaction mixture was allowed to cool to room temperature, extracted with ethyl acetate, and purified via flash chromatography on silica gel using hexane:ethyl acetate (9:1, v/v) as eluent followed by recrystallization with ethanol to give the desired product (1.0 g, 64.9%) as a white solid.

B. Synthesis of 4,8-bis(2-methoxyethoxy)-1S-dioxo-5S-dioxobenzo[1,2-b:4,5-b']dithiophene (BDT-1-Sulfone)

BDT-1 (0.15 g, 0.44 mmol) was dissolved in dichloromethane, followed by slow addition of meta-chloroperbenzoic acid (mCPBA) (0.59 g, 2.66 mol) over about 15 minutes. The reaction vessel was covered with aluminum foil and stirred overnight at room temperature. The reaction mixture was then quenched using about 2 mL of saturated aqueous NaHCO$_3$. The organic layer was washed with saturated aqueous NaHCO$_3$ three times and dried over MgSO$_4$. The crude product was purified by silica gel flash chromatography using ethyl acetate:hexanes (1:1) as eluent, followed by evaporation of the product-containing fractions, to provide the desired product (0.14 g, 79.3%) as a light yellow solid.

C. Synthesis of 4,8-bis(2-methoxyethoxy)-2,6-dibromobenzo[1,2-b:4,5-b']dithiophene and 4,8-bis(2-methoxyethoxy)-2,6,7-tribromobenzo[1,2-b:4,5-b']dithiophene BDT-1 was brominated with dilute bromine in dichloromethane. A solution of bromine (1.42 g, 8.86 mmol) in about 30 mL of dichloromethane was added dropwise to a solution BDT-1 (1.5 g, 4.43 mmol) in about 43 mL of dichloromethane at about 0° C. The reaction mixture was then allowed to slowly warm up to room temperature and stirred overnight. The crude product was purified via silica gel flash chromatography using ethyl acetate:hexanes (1:10) as eluent, followed by evaporation of the product-containing fractions, to afford the desired product mixture (1.6 g, 72.7%) as a white solid.

D. Synthesis of 4,8-bis(2-methoxyethoxy)-2,6-difluorobenzo[1,2-b:4,5-b']dithiophene and 4,8-bis(2-methoxyethoxy)-2,6,7-trifluorobenzo[1,2-b:4,5-b']dithiophene BDT-1 was fluorinated by reaction of the mixture of 4,8-bis(2-methoxyethoxy)-2,6-dibromobenzo[1,2-b:4,5-b']dithiophene and 4,8-bis(2-methoxyethoxy)-2,6,7-tribromobenzo[1,2-b:4,5-b']dithiophene obtained in Example 1C with N-fluorobenzenesulfonimide. About 2.22 mL of n-butyllithium (5.56 mmol) was slowly added to a mixture of 4,8-bis(2-methoxyethoxy)-2,6-dibromobenzo[1,2-b:4,5-b']dithiophene and 4,8-bis(2-methoxyethoxy)-2,6,7-tribromobenzo[1,2-b:4,5-b']dithiophene (1.2 g, 2.42 mmol) in about 15 mL of dry tetrahydrofuran (THF) at about −78° C., and the reaction mixture was stirred at about −78° C. for about 1 hour. A solution of N-fluorobenzenesulfonimide (2.04 g, 6.29 mmol) in about 6 mL of dry THF was then slowly added to the reaction mixture, which was stirred for approximately two more hours. Upon the complete consumption of the starting materials, cold aqueous NH$_4$Cl (saturated) was added and extracted with ethyl acetate. The organic layer was dried over MgSO$_4$, and purified via silica gel flash chromatography using ethyl acetate:hexanes (1:10) as eluent, followed by evaporation of the product-containing fractions, to provide the desired product mixture (0.51 g, 56.3%) as a white solid.

Example 2. Electrochemical Evaluation of the Redox Reactants

The electrochemical properties of benzodithiophene compounds BDT-1 and BDT-1-Sulfone were evaluated using cyclic voltammetry in a Pt|Ag/Ag$^+$|Pt three-electrode cell containing a 10 mM concentration of the redox reactant compound in Electrolyte A (0.5 M tetrabutylammonium hexafluorophosphate (TBAPF$_6$) in acetonitrile) and Electrolyte B (1.2 M LiPF$_6$ in a mixture of ethylene carbonate (EC) and ethyl methyl carbonate (EMC) in an EC/EMC volume ratio of about 3/7) at 10 mM concentrations of the redox reactants, and in coin cells utilizing Electrolyte B.

A. BDT-1 Evaluation by Cyclic Voltammetry.

Figure 3:
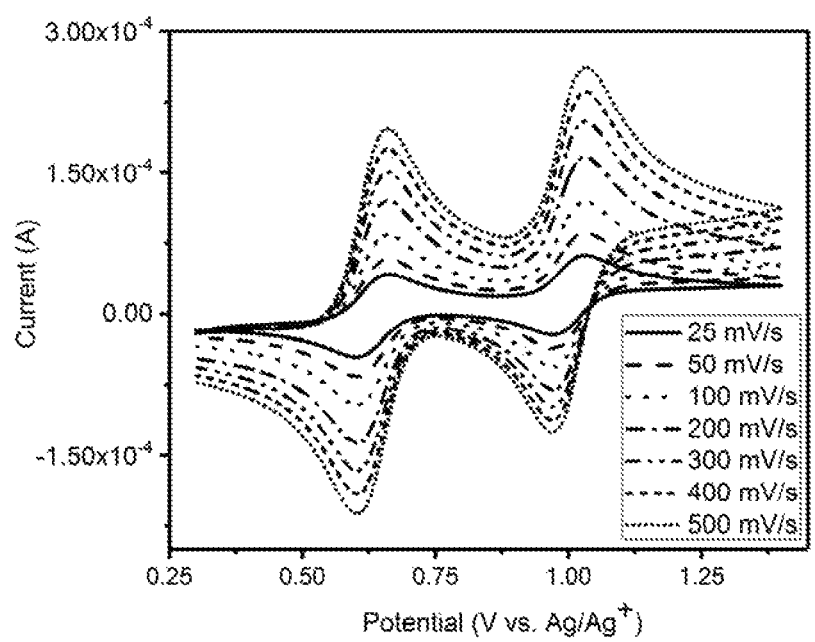
FIG. 3 shows cyclic voltammograms of 10 mM 4,8-bis(2-methoxyethoxy)benzo[1,2-b:4,5-b']dithiophene (BDT-1) in Electrolyte A (0.5 M tetrabutylammonium hexafluorophosphate ($TBAPF_6$) in acetonitrile) using a three electrode apparatus (Pt|Ag/$Ag^+$|Pt) at various scan rates given in mV/s.

BDT-1 exhibited well-defined, reversible redox waves with redox potentials of 0.63 V and 1.00 V, respectively, versus Ag/Ag$^+$ at scan rates from 25 mV/s to 500 mV/s (see FIG. 3). In addition, the ratios of the anodic peak current to the cathodic peak current of these two redox couples lie between 0.9 and 1.1, indicating the exceptional reversibility.

Figure 4:
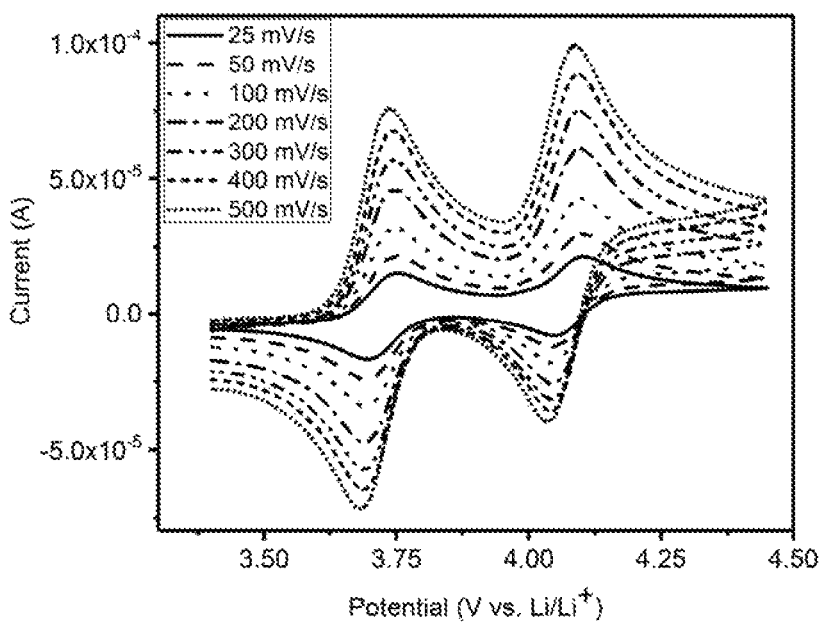
FIG. 4 shows cyclic voltammograms of 10 mM BDT-1 in Electrolyte B (1.2 M $LiPF_6$ in a mixture of ethylene carbonate (EC) and ethyl methyl carbonate (EMC) in an EC/EMC volume ratio of about 3/7) using a three electrode apparatus (Pt|Li|Li) at various scan rates given in mV/s.

The electrochemical properties of BDT-1 were also evaluated using cyclic voltammetry in a Pt|Li|Li three-electrode cell containing a 10 mM concentration of the redox reactant compound in Electrolyte B at scan rates from 25 mV/s to 500 mV/s. BDT-1 exhibited well-defined, reversible redox waves with redox potentials of about 3.7 V and 4.1 V, respectively, versus Li/Li$^+$ (see FIG. 4). The ratios of the anodic peak current to the cathodic peak current of these two redox couples lie between 0.9 and 1.0, indicating the exceptional reversibility. DBBB was evaluated as a comparison in the same procedure.

Table 1 summarizes redox potentials determined by analysis of cyclic voltammograms over a range of scan rates, molecular weight per electron, intrinsic capacity and energy density for BDT-1 compared to DBBB standard. For the evaluation, the redox species concentration was 10 mM BDT-1 in Electrolyte B, and studies were performed in a Pt/Li/Li cell.

TABLE 1

| Compound | Redox Potential (V vs. Li/Li+) | Molecular Weight per Electron (g/mol) | Intrinsic Capacity (mAh/g) | Energy Density (Wh/kg) |
|---|---|---|---|---|
| BDT-1 | 3.7, 4.1 | 169.22 | 158.41 | 617.80 |
| DBBB | 4.0 | 338.49 | 79.19 | 316.76 |

As is evident from the data in Table 1, BDT-1 provides nearly twice the energy density per gram as DBBB, at comparable redox potentials.

B. BDT-1 Evaluation in Coin Cells:

The positive electrode material was composed of about 80 percent by weight (wt %) $LiFePO_4$ (LFP), about 8 wt % polyvinylidene fluoride (PVDF) binder, and about 12 wt % carbon black coated on an aluminum current collector. The loading density of the positive electrode active material was about 12.1 mg/cm$^2$. The negative electrode was composed of 87 wt % lithium titanate ($Li_4Ti_5O_{12}$) (LTO), about 5 wt % carbon black, and about 8 wt % PVDF binder coated on a copper current collector. The loading density of the negative electrode active material was about 8 mg/cm$^2$. The separator used in the coin cell assembly was a polypropylene/polyethylene/polypropylene separator (PP/PE/PP; CELGARD 2325). The base electrolyte used was composed of 1.2 M $LiPF_6$ in a mixture of ethylene carbonate (EC) and ethyl methyl carbonate (EMC) in an EC/EMC volume:volume (v:v) ratio of about 3/7), referred to as Electrolyte A herein, and containing the redox shuttle additive at specified concentrations. All electrodes used were dried at 100° C. prior to use and all coin cells were assembled in an argon-atmosphere under constant-temperature (30° C.).

Figure 5:
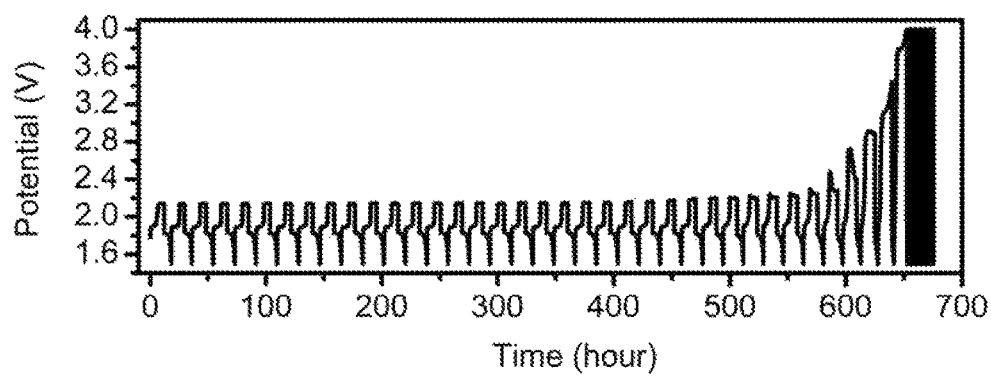
FIG. 5 shows a voltage profile of overcharge data from coin cells using an Electrolyte B containing 0.2 M BDT-1; charging rate of C/6 and overcharge rate of 100%. The plot shows data for the first 650 hours of cycling.
Figure 6:
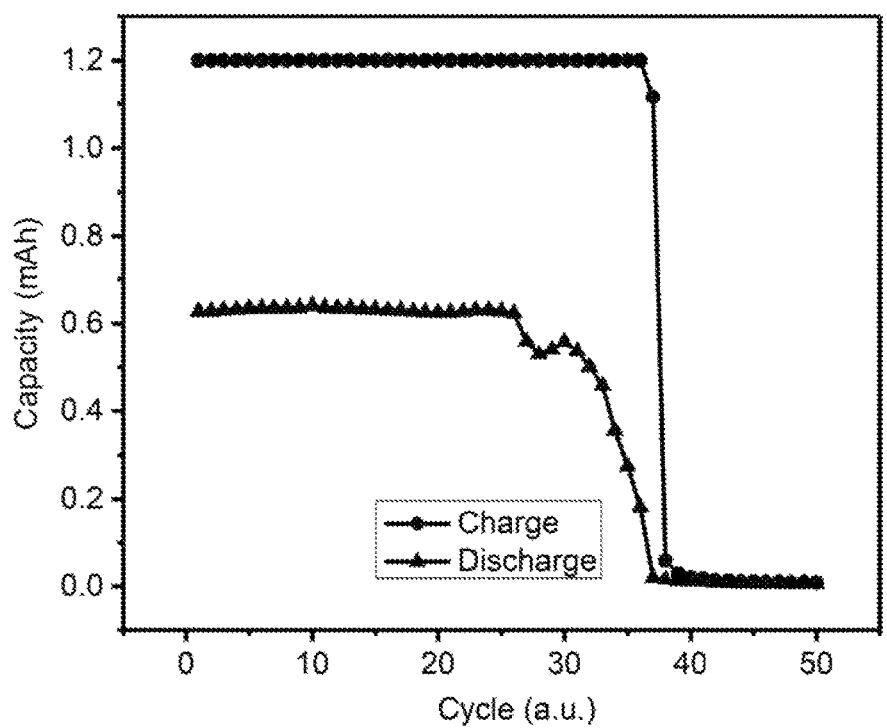
FIG. 6 shows a capacity profile from an overcharge test of coin cells using an Electrolyte B containing 0.2 M BDT-1; charging rate of C/6 and overcharge rate of 100%.

BDT-1 was evaluated in coin cells at a 0.2 M concentration in Electrolyte B at a charging rate of C/6 and 100% overcharge rate, using a lithium titanium oxide ($Li_4Ti_5O_{12}$; "LTO") anode and a lithium iron phosphate ($LiFePO_4$ "LFP") cathode. FIG. 5 provides a voltage profile from the coin cell evaluation, which shows overcharge protection for over 600 hours of cycling. FIG. 6 provides plots of capacity versus cycle number for charging and discharging of the coin cells, which show minimal capacity loss for over 25 cycles.

C. BDT-1-Sulfone Evaluation by Cyclic Voltammetry.

Figure 7:
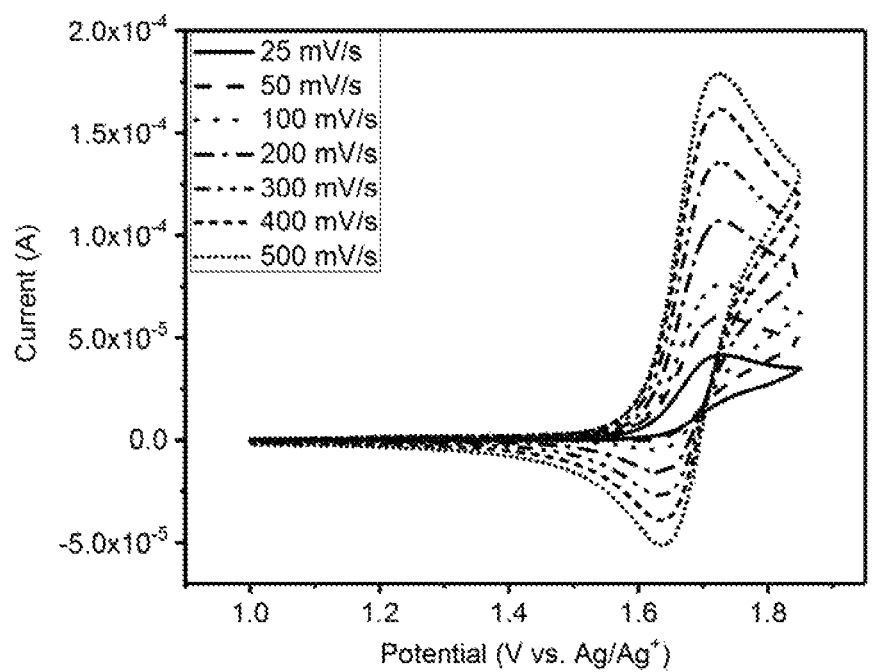
FIG. 7 provides cyclic voltammograms of 10 mM BDT-1-Sulfone in Electrolyte A using a three electrode apparatus (Pt|Ag/$Ag^+$|Pt) at various scan rates given in mV/s.

BDT-1-Sulfone exhibited a well-defined, reversible redox wave with a redox potential of about 1.7 V versus Ag/Ag$^+$ (see FIG. 7) at scan rates from 25 mV/s to 500 mV/s. In addition, the ratio of the anodic peak current to the cathodic peak current was about 0.45.

Figure 8:
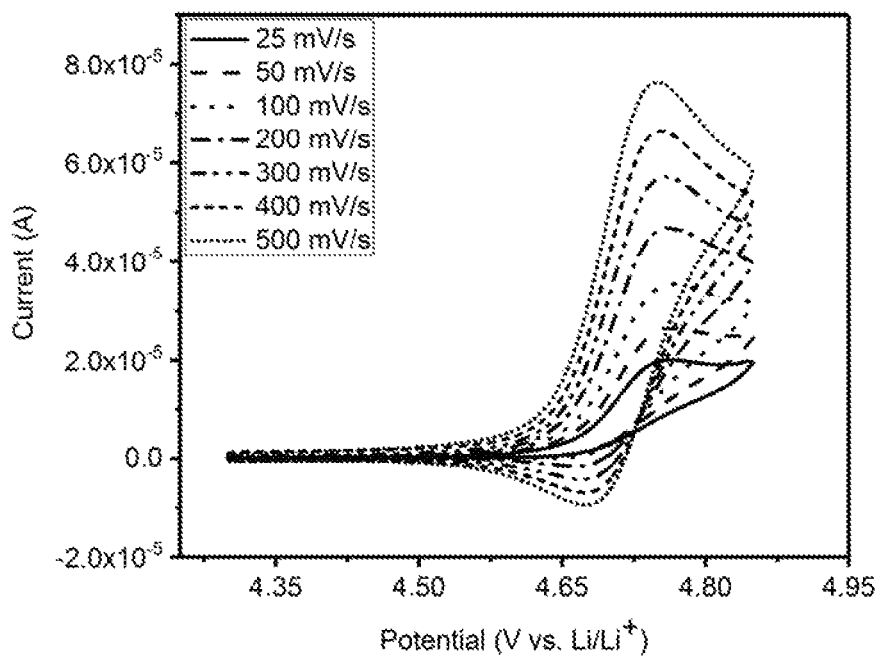
FIG. 8 provides cyclic voltammograms of 10 mM BDT-1-Sulfone in Electrolyte B using a three electrode apparatus (Pt|Ag/$Ag^+$|Pt) at various scan rates given in mV/s.

The electrochemical properties of BDT-1-Sulfone were also evaluated using cyclic voltammetry in a Pt|Li|Li three-electrode cell containing a 10 mM concentration of the redox reactant compound in Electrolyte B at scan rates from 25 mV/s to 500 mV/s. BDT-1-Sulfone exhibited well-defined, reversible redox waves with redox potential of about 4.7 V versus Li/Li$^+$ (see FIG. 8). In addition, the ratio of the anodic peak current to the cathodic peak current was about 0.12.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Embodiments of the invention in which an exclusive property or privilege is claimed are defined as follows:

1. A redox flow battery comprising:
   (a) an anode within an anolyte chamber;
   (b) a cathode within a catholyte chamber;
   (c) an anolyte comprising a solution of a first redox reactant and a first electrolyte salt;
   (b) a catholyte comprising a solution of a second redox reactant and a second electrolyte salt; and
   (e) an ion-permeable separator membrane forming at least a portion of a common wall between the anolyte chamber and the catholyte chamber;

wherein:
the anolyte contacts the anode and the separator membrane when circulated through the anolyte chamber;
the catholyte contacts the cathode and the separator membrane when circulated through the catholyte chamber;
during charging and discharging the anolyte and catholyte are circulated over the anode and cathode, respectively, while cations from the anolyte and catholyte shuttle through the separator membrane to balance charges that develop due to oxidation and reduction of the first and second redox reactants;
the first redox reactant has a lower redox potential than the redox potential of the second redox reactant;
and wherein the second redox reactant comprises a compound of Formula (I):

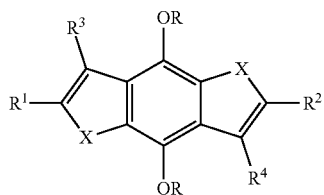

(I)

wherein:
each X is S or $SO_2$;
each R independently is selected from H, alkyl, substituted-alkyl, and a poly(alkylene glycol);
$R^1$, $R^2$, $R^3$, and $R^4$ are independently selected from H, alkyl, substituted-alkyl, halogen, —OR', —SR', —$SO_2$R', —(C═O)OR', —(C═O)NR'$_2$, —CN, —(C═O)R', a sulfonic acid group, and a phosphonic acid group;
each R' independently is selected from H, alkyl, and substituted-alkyl; and
each substituted-alkyl independently is an alkyl group substituted by one or more of F, Cl, Br, CN, $CF_3$, an alkenyl group, an alkynyl group, an aryl group, a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, a sulfonic acid group, and a phosphonic acid group.

2. The redox flow battery of claim 1, wherein the second redox reactant is dissolved in an organic solvent.

3. The redox flow battery of claim 1, wherein the organic solvent is selected from one or more of an organic carbonate, an ether, an ester, a sulfone, a sulfoxide, and a nitrile.

4. The redox flow battery of claim 1, wherein the catholyte comprises an aqueous solution of the compound of second redox reactant, and the compound of Formula (I) comprises at least one acidic or basic substituent and is soluble in water and/or an aqueous acid.

5. The redox flow battery of claim 1, wherein the compound of Formula (I) comprises one or more of:
4,8-bis(2-methoxyethoxy)benzo[1,2-b:4,5-b']dithiophene,
4,8-bis(2-methoxyethoxy)-2,6-dibromobenzo[1,2-b:4,5-b']dithiophene,
4,8-bis(2-methoxyethoxy)-2,3,6-tribromobenzo[1,2-b:4,5-b']dithiophene,
4,8-bis(2-methoxyethoxy)-2,6-difluorobenzo[1,2-b:4,5-b']dithiophene,
4,8-bis(2-methoxyethoxy)-2,3,6-trifluorbenzo[1,2-b:4,5-b']dithiophene, and
4,8-bis(2-methoxyethoxy)-1S-dioxo-5S-dioxbenzo[1,2-b: 4,5-b']dithiophene.

6. The redox flow battery of claim 1, wherein the compound of Formula (I) is a compound of Formula (II):

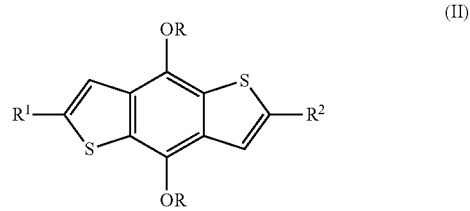

(II)

wherein:
each R independently is selected from H, alkyl, substituted-alkyl, and a poly(alkylene glycol) group;
each $R^1$ and $R^2$ independently is selected from H, alkyl, substituted-alkyl, halogen, —OR', —SR', —$SO_2$R', —(C═O)OR', —(C═O)NR'$_2$, —CN, —(C═O)R', —NR'$_2$, a sulfonic acid group, and a phosphonic acid group;
each R' is selected from H, alkyl, and substituted-alkyl; and
each substituted-alkyl independently is an alkyl group substituted by one or more of F, Cl, Br, CN, $CF_3$, an alkenyl group, an alkynyl group, and aryl group, a carboxylic acid group, an aldehyde group, ketone group, an alkoxy group, a thiol group, an alkylthio group, a primary amino group, a secondary amino group, a tertiary amino group, a trialkylsilyl group, a trialkylsilyloxy group, a sulfonic acid group, and a phosphonic acid group.

7. The redox flow battery of claim 6, wherein each R is —$CH_2$—$CH_2$—OR'; and R' is methyl or ethyl.

8. The redox flow battery of claim 6, wherein at least one of $R^1$ and $R^2$ is a halogen.

9. The redox flow battery of claim 1, wherein each X is S.

10. The redox flow battery of claim 9, wherein each R is a group of formula: —(CR''$_2$—CR''$_2$O)$_x$—R', wherein x is 1 to 100, and each R'' is H or alkyl.

11. The redox flow battery of claim 9, wherein each R is $C_1$ to $C_4$ alkyl.

12. The redox flow battery of claim 9, wherein each R is —$CH_2$—$CH_2$—OR; and R' is methyl or ethyl.

13. The redox flow battery of claim 9, wherein at least one of $R^1$, $R^2$, $R^3$, and $R^4$ is a halogen.

14. The redox flow battery of claim 13, wherein at least one of $R^1$, $R^2$, $R^3$, and $R^4$ is F.

15. The redox flow battery of claim 1, wherein each X is $SO_2$.

16. The redox flow battery of claim 15, wherein each R is a group of formula: —(CR''$_2$—CR''$_2$O)$_x$—R', wherein x is 1 to 100, and each R'' is H or alkyl.

17. The redox flow battery of claim 15, wherein each R is $C_1$ to $C_4$ alkyl.

18. The redox flow battery of claim 15, wherein each R is —$CH_2$—$CH_2$—OR; and R' is methyl or ethyl.

19. The redox flow battery of claim 15, wherein at least one of $R^1$, $R^2$, $R^3$, and $R^4$ is a halogen.

20. The redox flow battery of claim 19, wherein at least one of $R^1$, $R^2$, $R^3$, and $R^4$ is F.

* * * * *

UNITED STATES PATENT AND TRADEMARK OFFICE
CERTIFICATE OF CORRECTION

PATENT NO.         : 10,424,805 B2
APPLICATION NO.    : 15/677255
DATED              : September 24, 2019
INVENTOR(S)        : Jingjing Zhang, Lu Zhang and Ilya A. Shkrob Page 1 of 1

It is certified that error appears in the above-identified patent and that said Letters Patent is hereby corrected as shown below:

In the Claims

Claim 1, Column 14, Line 63, delete "(b)" and insert --(d)--.
      Column 15, Line 36, before "a sulfonic acid group,", insert -- -NR'2--.

Claim 9, Column 16, Line 45, delete "Xis S" and insert --X is S--.

Claim 12, Column 16, Line 52, delete "-CH2-CH2-OR" and insert -- -CH2-CH2-OR'--.

Claim 15, Column 16, Line 57, delete "Xis" and insert --X is--.

Claim 18, Column 16, Line 65, delete "-CH2-CH2-OR" and insert -- -CH2-CH2-OR'--.

Signed and Sealed this
Nineteenth Day of November, 2019

Andrei Iancu
*Director of the United States Patent and Trademark Office*